US006204479B1

(12) United States Patent
Sickels

(10) Patent No.: US 6,204,479 B1
(45) Date of Patent: Mar. 20, 2001

(54) THERMISTOR PROTECTION FOR A WIRE FEED MOTOR

(75) Inventor: Darrell L. Sickels, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/374,067

(22) Filed: Aug. 13, 1999

(51) Int. Cl.[7] ...................... B23K 9/133
(52) U.S. Cl. ...................... 219/137.71
(58) Field of Search ...................... 219/137.71, 137.7; 361/25, 27

(56) References Cited

U.S. PATENT DOCUMENTS

| | | | |
|---|---|---|---|
| Re. 31,367 | 8/1983 | D'Entremont . | |
| 4,119,830 * | 10/1978 | Gilliland | 219/137.71 |
| 4,408,244 | 10/1983 | Weible . | |
| 4,856,078 | 8/1989 | Konopka . | |
| 5,006,778 | 4/1991 | Bashark . | |
| 5,264,766 | 11/1993 | Tracht et al. . | |
| 5,617,001 | 4/1997 | Nacewicz et al. . | |
| 5,793,171 | 8/1998 | Hayashi et al. . | |
| 5,990,447 | 11/1999 | Nowak et al. . | |
| 6,066,834 * | 5/2000 | Rebold | 219/137.71 |

OTHER PUBLICATIONS

Hobart® Welding Products Handler 120/150 And Piecemaker 14A Gun Apr. 1999.

* cited by examiner

*Primary Examiner*—Clifford C. Shaw
(74) *Attorney, Agent, or Firm*—George R. Corrigan

(57) ABSTRACT

A system for arc welding includes a welding power supply and a wire feeder. The wire feeder includes a dc wire feed motor and a dc wire feed power supply in electrical communication with the wire feed motor. A PTC thermistor is disposed electrically between the power supply and the wire feed motor. Current flows from the power supply, through the PTC thermistor, and then to the motor. Under normal current conditions the PTC thermistor allows current to be provided to the wire feed motor from the power supply, but under excessive current conditions the PTC thermistor inhibits current from being provided to the wire feed motor from the power supply. A diode is connected in anti-parallel with the motor. A pulse width modulation switch control current delivered to the motor. A normally open relay is closed when welding is to be performed to provide current to the motor, and a normally closed relay, connected in parallel with and shunting the motor, is opened when welding is to be performed. The normally closed relay acts as a brake on the motor when it is closed. The PTC thermistor is not shunted by a resistor and/or a varistor, and/or is not in parallel with a relay.

32 Claims, 2 Drawing Sheets

THERMISTOR PROTECTION FOR A WIRE FEED MOTOR

FIELD OF THE INVENTION

The application relates generally to wire feeders used in arc welding, and, more particularly, to protecting a wire feed motor.

BACKGROUND OF THE INVENTION

Many welding applications such as MIG (metal inert gas) or GMAW (gas metal arc welding) utilize a wire feeder to provide filler metal to the weld. Generally, the wire feeder will provide wire at a nominally constant speed. A typical prior art wire feeder includes a motor that pulls wire from a reel and feeds the wire at a wire feed speed to the weld arc. The motor is controlled by a wire feed controller that may be a stand alone controller or may be part of a controller that controls other aspects of the welding process. The wire feed controller controls the speed of the wire feeder and typically includes a potentiometer (or digital up/down input buttons) on a front panel of the controller which the user uses to set wire feed speed.

A trigger on the gun (torch) is pulled when the user wants to weld. A trigger circuit causes power to be provided to the wire feed motor, and wire is fed to the arc, along with welding power. When the user releases the trigger, power is removed from the wire feed motor and the arc. Under normal operating conditions the wire feeder provides the wire to the arc and the current draw of the motor is within an acceptable range.

However, occasionally a feed problem such as the wire inadvertently being welded to the gun tip, or becoming tangled, will cause the wire feed motor to stall. The stalled motor will draw excessive current, and cause overheating of the motor windings. This can damage the motor, or cause other problems.

One known way to prevent motor damage from excessive current draw due to a stall is to provide a fuse or fusible link electrically between the motor and power source. When excessive current is drawn, the fuse opens the motor power line. However, the fuse or fusible link needs to be replaced prior to restarting the wire feeder, causing inconvenience and down-time.

One known protection device is a thermistor, which has been used in non-welding applications. However, many non-welding thermistor applications involve using the thermistor to control current through a relay coil, and opening the coil in response to undesired high current. This sort of scheme requires an additional relay, and may result in excessive wear and tear to the relay.

Other non-welding thermistor applications involve using the thermistor as both a protective element and a control element, wherein the thermistor is used to inhibit current under extreme conditions, and controls the magnitude of power provided under normal conditions. Such a scheme is of little use for an application such as a wire feed motor having the power controlled elsewhere.

One thermistor application involves using a thermistor for a start-up circuit protection. The thermistor is shunted with a relay, and the relay is closed after the start-up circuit has precharged components, and the power source is connected to the proper input power, and the thermistor's protective function ends. If the power source is connected to improper input power the thermistor blocks the pre-charge, and the relay is not closed. However, in an application such as a wire feed motor the excessive current may occur at times other than start-up.

Accordingly, it is desirable to have a protective circuit for a welding wire feed motor that is relatively inexpensive, unlikely to wear, useful beyond start-up, and is not used to otherwise control power. Preferably, such a circuit should not require user intervention to restart the motor after the protective function is performed.

SUMMARY OF THE PRESENT INVENTION

According to a first aspect of the invention a wire feeder for arc welding includes a wire feed motor and a wire feed power supply in electrical communication with the wire feed motor. A PTC thermistor is disposed electrically between the power supply and the wire feed motor.

Under normal current conditions the PTC thermistor allows current to be provided to the wire feed motor from the power supply, but under excessive current conditions the PTC thermistor inhibits current from being provided to the wire feed motor from the power supply in one embodiment.

The motor is a dc motor and the power supply provides current in one direction, and current flows from the power supply, through the PTC thermistor, and then to the motor in another embodiment.

A pulse width modulation switch controls current delivered to the motor, and/or a diode is connected in anti-parallel with the motor in various alternatives. Current flows from the motor, through switch, and then to the power supply in another embodiment.

A normally open relay is closed when welding is to be performed to provide current to the motor, and/or a normally closed relay, connected in parallel with and shunting the motor, is opened when welding is to be performed, in various embodiments. The normally closed relay acts as a brake on the motor when it is closed.

The PTC thermistor is not shunted by a resistor and/or a varistor, and/or is not in parallel with a relay in alternative embodiments.

According to another alternative the wire feeder is part of a system for arc welding that also includes a welding power supply.

Other principal features and advantages of the invention will become apparent to those skilled in the art upon review of the following drawings, the detailed description and the appended claims.

Figure 1:
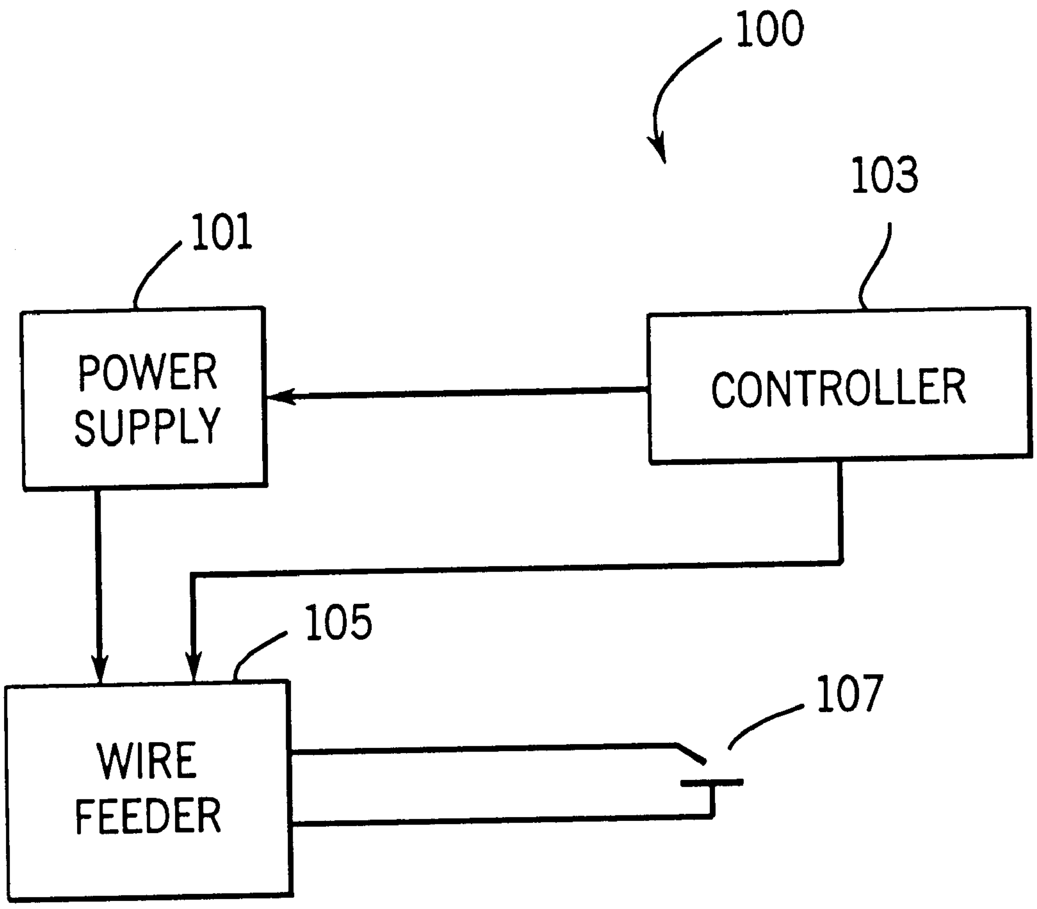
FIG. 1 is a block diagram of a welding power supply constructed in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

Generally, the present invention provides for protecting a wire feed motor from excessive current with an in-line thermistor. The thermistor is preferably not shunted, nor used for other control purposes. The invention will be illustrated with reference to a particular protection circuit, control circuit, power supply and wire feeder. It should be understood at the outset that the invention may be implemented using other circuits, power supplies, and wire feeders.

Referring now to FIG. 1 a block diagram of a welding system that implements the present invention is shown. A MIG welding system 100 includes a wire feeder 105 which is controlled by a controller 103. A MIG power supply 101 is also controlled by controller 103. In operation power supply 101 provides power to wire feeder 105. Wire feeder 105 feeds wire to an arc 107, at a rate determined by controller 103.

In accordance with the preferred embodiment welding system 100 may be of the type sold commercially, such as a Hobart Handler® 120/150. Power supply 105 receives input power via a 115/230 VAC receptacle.

Power supply 101, controller 103 and wire feeder 105 are shown as discrete blocks in FIG. 1. However, in practice, controller 103 may be part of power supply 101 or wire feeder 105. Additionally, all three blocks may be contained within a single housing, and may be sold as a unit or separately. In other alternatives controller 103 is distributed such that part of it is in power supply 101, and part of it is in wire feeder 105.

Figure 2:
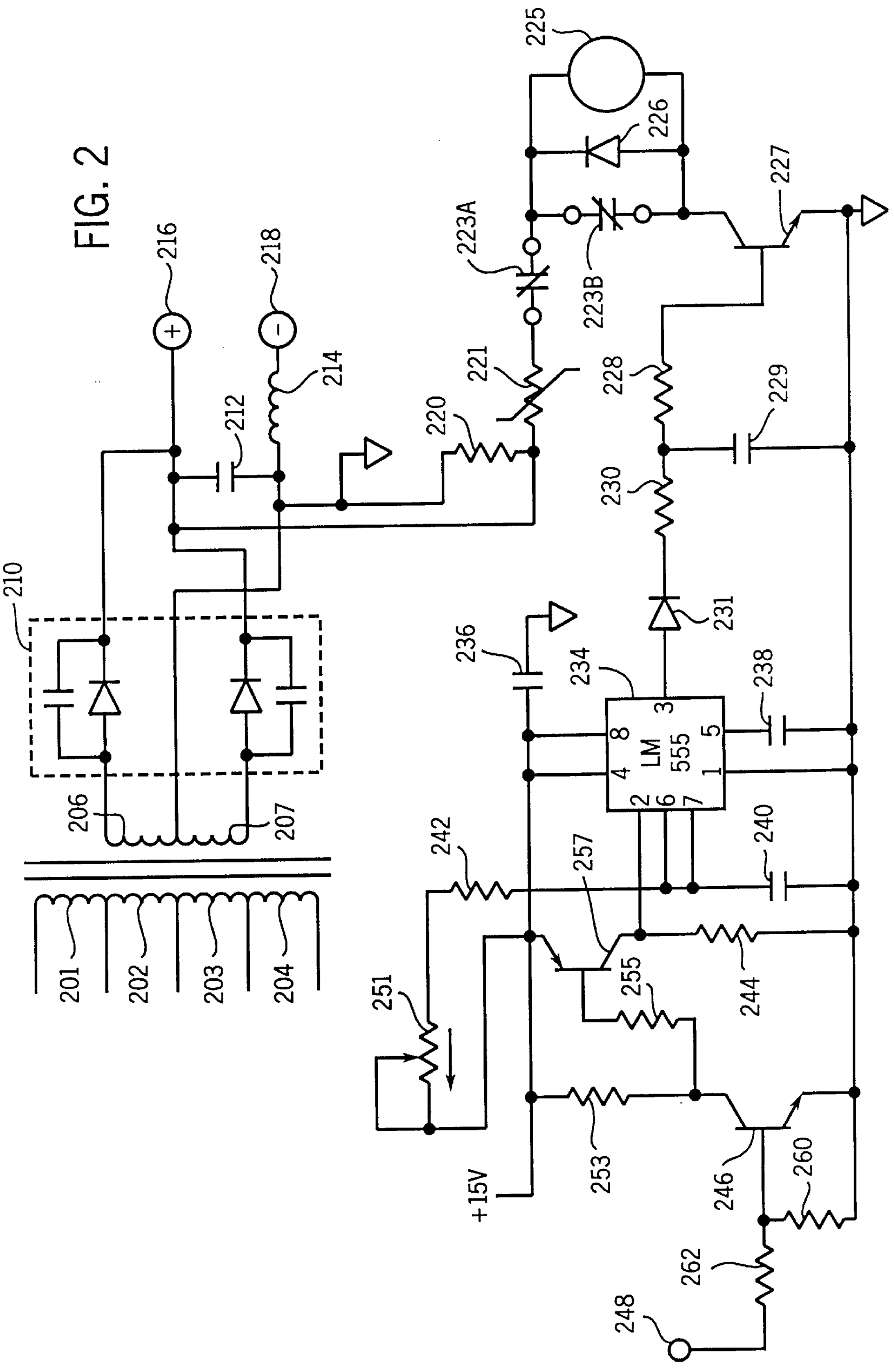
FIG. 2 is a schematic of a circuit implementing the present invention.

Power supply 101 includes a power transformer such as that shown in FIG. 2. (Other circuitry of power supply 101 is not shown). As seen in FIG. 2 the primary side of the transformer has four taps and multiple windings 201–204, and the secondary has two windings 206–207. A rough control of the output welding voltage is obtained by selecting one of the various taps on the primary side of winding (which is connected to the 115/230 VAC input). Primary windings 201–204 have 113 turns, 11 turns, 12 turns, and 13 turns, respectively. Secondary windings 206 and 207 each have 20 turns. Thus, depending upon the tap selected, the peak secondary voltage will be between 28.78 volts and 21.83 volts.

The secondary of the transformer is connected to a weld output power circuit which includes a center-tapped full-wave rectifier circuit 210. Two half-wave rectifier circuits are combined to use both half-cycles of the secondary output voltage. A large electrolytic capacitor 212 (53,000 $\mu$F) filters the full-wave rectified signal into a smooth DC signal. A resistor 220 (50 ohms) is provided on the pc board to discharge capacitor 21. An output choke or inductor 214 (345 $\mu$H) is provided to smooth current flow to a pair of weld output studs 216 and 218. The core size, and component values may be calculated in a conventional manner.

The circuit and topology of FIG. 2 is used in the preferred embodiment, but any circuit, topology, and power supply may be used as well. Examples of other arrangements with which this invention may be implemented include (but are not limited to) convertors or invertors, phase control, control by switching (not tap selection), AC output, CV output, etc.

In accordance with the present invention, a protective PTC (positive temperature coefficient) thermistor 221 is provided to avoid damaging the motor when a feed motor stall causes excessive current (10%, 20%, or more excess current over the expected, typical, or rated current, e.g.).

The rectified output of rectifier 210 is also provided to a wire feed motor 225 through PTC thermistor 221. PTC thermistor 221 provides over-current protection to the motor circuit. The holding current of PTC thermistor 221 is rated at 1.1A. The normal operating current of the motor while it's feeding wire is 0.9A. If the motor is stalled due to a feed problem, it will draw excessive current and cause PTC thermistor 221 to switch to a high impedance state, effectively opening the motor circuit. PTC thermistor 221 will remain in its high-impedance state until power is removed from the circuit and the PTC is allowed to cool.

PTC thermistor 221 is in electrical communication with wire feed motor 225 because current can flow from PTC thermistor 221 to wire feed motor (either directly or though other components) in series, parallel or other combination with PTC thermistor 221 and wire feed motor 225). PTC thermistor 221 is electrically between the power supply and wire feed motor 225 because current that flows from the power supply to PTC thermistor 221 flows to wire feed motor 225.

Also, PTC thermistor 221 does not have any control function: it only allows current to pass when in its low impedance state, or inhibits (i.e., reduces to an acceptable level) current when its resistance rises.

PTC thermistor 221 is not shunted to ground by a resistor or varistor, as many prior art thermistor protection circuits require (i.e., current does not flow from the power source through PTC thermistor 221 and then to ground through a resistor or varistor). Nor is PTC thermistor 221 shunted by a resistor, varistor, or relay as many prior art thermistor protection circuits require (i.e., not in parallel with). As used herein, shunted means in parallel with or shunted to ground.

Motor 225 is a dc motor and the power supply is a dc power source, thus current flows from the high output of the power supply (node 216) through PTC thermistor 221, and through a normally open relay 223A, and then to the motor (to the motor windings).

Normally open relay 223A is closed when the gun (torch) switch is closed, and power is thus provided to the wire feed motor. Normally open relay 223A opens when the gun (torch) switch is released and power is thus removed from the wire feed motor. A normally closed relay 223B is provided to short the wire feed motor and provide a dynamic brake to the motor when the contactor gun (torch) switch is released (magnetically braking the motor). Normally closed relay 223B is opened when the gun (torch) switch is closed, and the brake is thus removed. Normally closed relay 223B is closed when the gun (torch) switch is opened, and the brake is thus applied.

Feed motor 225 is connected to ground (which is also the low output of the power supply) through a transistor 227 (part of controller 103), which controls the turning on and off of feed motor 225. As will be explained below, transistor 227 is a pulse width modulation switch, and controls the speed of the motor by controlling current delivered to the motor. When transistor 227 is open no current flows to the motor, and when transistor 227 is closed, current flows to the motor (windings)

A flyback diode 226 is in anti-parallel with motor 225 (i.e., antiparallel to the direction of current flow from the dc power supply through the dc motor windings). Diode 226 is provided across the motor winding to provide a path for the energy to dissipate while transistor 227 is not on. An RC network comprised of resistor 228 (3.92 K ohms), resistor 230 (1.00K ohms) and capacitor 229 (0.001 $\mu$F) protects transistor 227 from noise generated by motor 225.

Some of the circuit described above, and the portion of the circuit described below is part of the preferred embodiment, but not necessarily needed.

Controller 103 includes a wire feed speed (WFS) control circuit which is generally a pulse width modulated control.

Greater pulse widths deliver more power to motor 225, and result in a faster wire feed speed. The pulse width modulation is implemented using a low-cost, industry-standard LM555 timer 234. Motor 225 runs fastest with the output of timer 234 at its maximum pulse width. The output pulse of timer 234 (pin 3) is applied through a diode 231 to the RC network comprised of resistors 230 and 228 and capacitor 229. In the preferred embodiment the current provided to the motor is a speed control input because the speed of the motor is responsive to the average current magnitude. The speed control input may be a digital or analog control signal in embodiments where the motor includes a controller.

Generally, timer 234 is configured in a conventional manner and its pulse width is adjusted by a user selectable input such as a nonlinear potentiometer 251 (0–50K ohms), or some other speed control input. The potentiometer may be replaced with digital components such as an up/down button and a microprocessor, or a potentiometer and a look-up table in other embodiments). Potentiometer 251 is nonlinear in a manner so as to compensate for other nonlinearities in the timing circuit, as will be described in detail below. Potentiometer 251 is part of an input circuit because it provides an input (a user input in the preferred embodiment) to the controller. The input circuit may include other components, such as filters, amplifiers, a/d convertors, etc.

The pulse width/timing may be understood beginning with node 248. The signal at node 248 is the full-wave rectified line signal (60 Hz in the United States), thus this signal goes to 0V every 8.3 mS. The signal at node 248 is applied to the base of a transistor 246 through resistors 262 (10K ohms) and 260 (10K ohms). Each time the signal at node 248 drops below 0.7V, a transistor 246 is switched off. Transistor 246 is connected to the base of a transistor 257 through a resistor 255 (10K ohms) (and to a regulated 15V supply through a resistor 253 (10K ohms)). Thus, when transistor 246 is turned off, transistor 257 turns off. This removes the voltage across a resistor 244 (10K ohms), which is connected to the trigger input (pin 2) of timer 234. When the signal at node 248 rises above 0.7V and switches transistor 246 on, transistor 257 is switched on, which applies 15V across resistor 244. This creates a trigger pulse for timer 234 at pin 2 which is synchronized to the AC line at 120 Hz.

Each time timer 234 is triggered by a low signal at pin 2, the output (pin 3) goes high for a time determined by an RC combination of potentiometer 251, resistor 242, (10.0K ohms) and capacitor 240 (0.1 $\mu$F). Capacitor 240 will charge from the +15V supply through potentiometer 251 and resistor 242 ohms) when a trigger occurs, until the voltage at pins 6 and 7 of timer 234 reaches the threshold voltage ($\frac{2}{3}$ $V_{cc}$) or 10V, and then capacitor 240 discharges (through timer 234). The output of timer 234 (pin 3) will switch to a high state while capacitor 240 is charging and will remain high until capacitor 240 discharges.

Any signal which is created as part of the timing circuit may be considered an intermediate control signal. For example, the voltage across resistor 242, or the voltage at pins 6 & 7 of timer 234 may be considered intermediate control signals.

With potentiometer 251 adjusted to its minimum (shorted-out), the charging time, and thus the pulse width and motor speed, is at a minimum. As the WFS control (potentiometer 251) is rotated to maximum, the charging time of capacitor 240 is increased as resistance is added into the circuit, and the pulse width (and hence the motor speed) increases. With potentiometer 251 adjusted to its maximum, the charging time, and thus the pulse width and motor speed, is at a maximum.

Alternative embodiments include using a controller having all analog or predominantly digital circuitry. The timer circuit should be ideally linear, but the components used to implement the timing, and the non-ideal nature of real circuits, introduce nonlinearities into the PWM control. Thus, while the PWM circuit may be inexpensive it is nonlinear, or is a nonlinear stage.

Given the applications and processes for which the preferred MIG welding system is likely to be used, a linear response of wire feed speed relative to potentiometer setting is desired. Thus, in accordance with the preferred embodiment the nonlinear nature of the timing circuit is corrected by a nonlinear pot. Specifically, potentiometer 251 is created to be nonlinear in such a way as to compensate for the nonlinearity of the remainder of the timer circuit, i.e. the response of the timer circuit (excluding potentiometer 251 such as to an intermediate control signal at pins 6 & 7 of timer 234.

The desired resistance for various angular positions of potentiometer 251 was determined first by calculation, and then refined empirically, and was selected to provide an overall substantially linear response. However, the desired resistance could be determined in other ways, and could be chosen to provide other than a linear over response.

A nonlinear potentiometer may be purchased commercially, or may be specially made. The preferred potentiometer is similar to a linear potentiometer in that it has a partial annular (arcuate) shape and the wiper is turned by turning a knob on the front panel. The resistance is proportional to the width of the annulus, and it's nonlinearity is created by a changing width. The preferred potentiometer is created by laser trimming (i.e. cutting to a desired width) to create the desired width annulus. The changing width of the annulus may be smooth to produce a gradually changing (varying) response slope, or it may have a step change in width to create abrupt or step changes in response slope.

Thus, the input circuit of a controller can be made intentionally nonlinear to correct for nonlinearities elsewhere in the controller. This is preferably done with a nonlinear potentiometer that may be easily made and relatively inexpensive. Because the nonlinear potentiometer may correct for nonlinearities in the remainder of the control circuit, the remainder of the control circuit may be inexpensively made, using relatively few components.

Numerous modifications may be made to the present invention which still fall within the intended scope hereof, such as implementing the invention on a system used for other welding processes, providing an overall response that is intentionally nonlinear, precisely linear, providing a controller that is part of the wire feed motor (including an intermediate control signal).

Thus, it should be apparent that there has been provided in accordance with the present invention a method and apparatus for protecting a wire feed motor with a PTC thermistor that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A wire feeder for arc welding comprising:

a wire feed motor;

a power supply, in electrical communication with the wire feed motor;

a PTC thermistor disposed electrically between the power supply and the wire feed motor.

2. The apparatus of claim 1 wherein under normal current conditions the PTC thermistor allows current to be provided to the wire feed motor from the power supply, and further wherein under excessive current conditions the PTC thermistor inhibits current from being provided to the wire feed motor from the power supply.

3. The apparatus of claim 1 wherein the motor is a dc motor and the power supply provides current in one direction, and wherein the PTC thermistor is disposed such that current flows from the power supply, through the PTC thermistor, and then to the motor.

4. The apparatus of claim 3 wherein the power supply includes a pulse width modulation switch disposed to control current delivered to the motor.

5. The apparatus of claim 4 further including a diode connected in anti-parallel with the motor.

6. The apparatus of claim 5 wherein the switch is disposed such that current flows from the motor, through switch, and then to the power supply.

7. The apparatus of claim 6 further including a normally open relay that is closed when welding is to be performed, and is disposed such when the normally open relay is closed current flows from the power supply, through the normally open relay, and then to the motors.

8. The apparatus of claim 6 further including a normally closed relay that is opened when welding is to be performed, and is disposed such that when the normally closed relay is closed it is connected in parallel with and shunts the motor, whereby it acts as a brake on the motor.

9. The apparatus of claim 1 further including a normally closed relay that is opened when welding is to be performed, and is disposed such that when the normally closed relay is closed it is connected in parallel with and shunts the motor, whereby it acts as a brake on the motor.

10. The apparatus of claim 1 wherein the PTC thermistor is not shunted by a resistor and is not shunted by a varistor.

11. The apparatus of claim 1 wherein the PTC thermistor is not in parallel with a relay.

12. The apparatus of claim 1 wherein the PTC thermistor is not shunted by a varistor.

13. A wire feeder for arc welding comprising:

motor means for feeding wire;

power means for providing power to the motor means, wherein the power means is in electrical communication with the wire feed motor;

a PTC thermistor means for protecting the motor means, wherein the PTC thermistor means is disposed electrically between the power means and the motor means.

14. The apparatus of claim 13 wherein the PTC thermistor means is not shunted by a resistor and is not shunted by a varistor.

15. The apparatus of claim 14 further including a diode connected in anti-parallel with the motor means.

16. The apparatus of claim 13 further including a normally closed relay that is opened when welding is to be performed, and is disposed such that when the normally closed relay is closed it is connected in parallel with and shunts the motor means, whereby it acts as a brake on the motor means.

17. A system for arc welding comprising:

a welding power supply, disposed to provide power to an arc a wire feed motor, disposed to provide wire to an arc;

a wire feed power supply, in electrical communication with the wire feed motor;

a PTC thermistor disposed electrically between the wire feed power supply and the wire feed motor.

18. The apparatus of claim 17 wherein under normal current conditions the PTC thermistor allows current to be provided to the wire feed motor from the wire feed power supply, and further wherein under excessive current conditions the PTC thermistor inhibits current from being provided to the wire feed motor from the wire feed power supply.

19. The apparatus of claim 17 wherein the PTC thermistor is not shunted by a resistor and is not shunted by a varistor.

20. The apparatus of claim 17 wherein the PTC thermistor is not shunted by a resistor.

21. The apparatus of claim 17 wherein the PTC thermistor is not shunted by a varistor.

22. The apparatus of claim 17 wherein the motor is a dc motor and the wire feed power supply provides current in one direction, and wherein the PTC thermistor is disposed such that current flows from the wire feed power supply, through the PTC thermistor, and then to the motor.

23. The apparatus of claim 17 wherein the wire feed power supply includes a pulse width modulation switch disposed to control current delivered to the motor.

24. The apparatus of claim 23 further including a diode connected in anti-parallel with the motor.

25. The apparatus of claim 24 wherein the switch is disposed such that current flows from the motor, through switch, and then to the wire feed power supply.

26. The apparatus of claim 25 further including a normally open relay that is closed when welding is to be performed, and is disposed such when the normally open relay is closed current flows from the wire feed power supply, through the normally open relay, and then to the motor.

27. The apparatus of claim 26 further including a normally closed relay that is opened when welding is to be performed, and is disposed such that when the normally closed relay is closed it is connected in parallel with and shunts the motor, whereby it acts as a brake on the motor.

28. The apparatus of claim 17 wherein the wire feed power supply is the welding power supply.

29. A system for arc welding comprising:

welding power means for providing power to an arc;

motor means for feeding wire to the arc;

wire feed power means for providing power to the motor means, wherein the wire feed power means is in electrical communication with the wire feed motor;

a PTC thermistor means for protecting the motor means, wherein the PTC thermistor means is disposed electrically between the wire feed power means and the motor means.

30. The apparatus of claim 29 wherein the PTC thermistor means is not shunted by a resistor and is not shunted by a varistor.

31. The apparatus of claim 30 further including a diode connected in anti-parallel with the motor means.

32. The apparatus of claim 29 including a normally closed relay that is opened when welding is to be performed, and is disposed such that when the normally closed relay is closed it is connected in parallel with and shunts the motor means.

* * * * *